United States Patent [19]

Hall

[11] 4,380,404
[45] Apr. 19, 1983

[54] CLEVIS THIMBLE CONNECTOR

[76] Inventor: Gaddis G. Hall, P.O. Box 6699, Birmingham, Ala. 35210

[21] Appl. No.: 208,161

[22] Filed: Nov. 19, 1980

[51] Int. Cl.³ .................. F16C 11/00; F16D 1/12
[52] U.S. Cl. ................................ 403/79; 403/157; 403/206; D8/356; D8/382
[58] Field of Search ................ D8/364, 356, 382; D13/24; 403/79, 210, 212, 206, 157, 161; 248/228, 229

[56] References Cited

U.S. PATENT DOCUMENTS

| D. 202,895 | 11/1965 | Tiernan | D13/24 |
| 606,148 | 6/1898 | Huntoon | 403/79 |
| 861,775 | 7/1907 | Stevenson | 403/79 |
| 977,629 | 12/1910 | Hoerr | 403/79 |
| 983,901 | 2/1911 | Hoerr | 403/79 |
| 1,006,040 | 10/1911 | Alsberg | 403/79 |
| 2,942,313 | 6/1960 | Petersen | 403/373 |
| 3,562,875 | 2/1971 | Lindsey et al. | 403/79 |

Primary Examiner—Wayne L. Shedd
Attorney, Agent, or Firm—Woodford R. Thompson, Jr.

[57] ABSTRACT

A clevis thimble connector embodies an elongated body member having a clevis at one end for connection to a supporting structure and a thimble at the other end for receiving the loop end of a conductor. A laterally projecting member extends perpendicular to a conductor receiving groove in a thimble and is provided with an eye in spaced relation to the thimble for receiving a connector element of a device for applying tension to the conductor.

1 Claim, 3 Drawing Figures

CLEVIS THIMBLE CONNECTOR

BACKGROUND OF THE INVENTION

This invention relates to a clevis thimble assembly for connecting the loop end of a conductor and a tensioning device to a supporting structure and more particularly to such an assembly which has a pulling eye for attaching a tensioning device thereto.

Heretofore in the art to which my invention relates, difficulties have been encountered in the installation of conventional clevis thimble connectors because an excessive amount of time and effort has been required in connecting the hook-like member of a tensioning device, such as a comealong to the pulling or sagging eye while a conductor is attached to the thimble since the hook-like member interferes with the positioning of the conductor under tension. That is, in the usual assembly of a clevis thimble connector the clevis is attached to a supporting structure and the loop end of a conductor under tension is attached to the thimble with the loop being pushed to one side to provide clearance for inserting the hook-like member through the pulling eye. Also, clearance is provided for wrapping the legs of the usual preformed type deadend device around the conductor to form the loop end thereof. Moving the conductor to one side overstresses and stretches the conductor as the loop end thereof tries to occupy the same space as the hook-like member after tension is applied. Consequently, the conductor remains in the overstressed position or requires an adjustment, usually at a high elevation off the ground, to relieve the increased tension transferred thereto.

The following U.S. patents disclose conventional connectors of the type mentioned above: Nos. 2,761,189; 2,884,476; 2,946,108; 3,108,344; and 3,137,051.

SUMMARY OF THE INVENTION

In accordance with my invention, I overcome the above and other difficulties by providing an improved clevis thimble assembly which is simple of construction and requires a minimum of effort for installation in a quick and easy manner.

An object of my invention is to provide an assembly of the character designated which is economical to manufacture since it eliminates the use of a separate set core to form the internal groove and seat contour for proper support of the conductor and to form the pulling eye. This permits the use of a green sand core for the entire body of my improved connector with only a pin core being set for the clevis pin. Material and molding labor costs are thus significantly reduced with the green sand core as compared to the usual set up and molding costs for conventional clevis thimble conductors. Also, my improved connector is made from a smaller volume of metal than conventional connectors for given ranges of size and clevis ultimate strength rating.

My improved assembly includes an elongated body having a clevis at one end thereof adapted for connection to a suitable supporting structure. A convexly curved retainer groove is carried by the other end of the connector for receiving the loop end of a conductor. A laterally projecting member extends in a plane perpendicular to the retainer groove and is provided with an eye for attaching a tensioning device thereto.

BRIEF DESCRIPTION OF THE DRAWINGS

Apparatus embodying features of my invention is illustrated in the accompanying drawing, forming a part of this application, in which.

DETAIL DESCRIPTION

Figure 1:
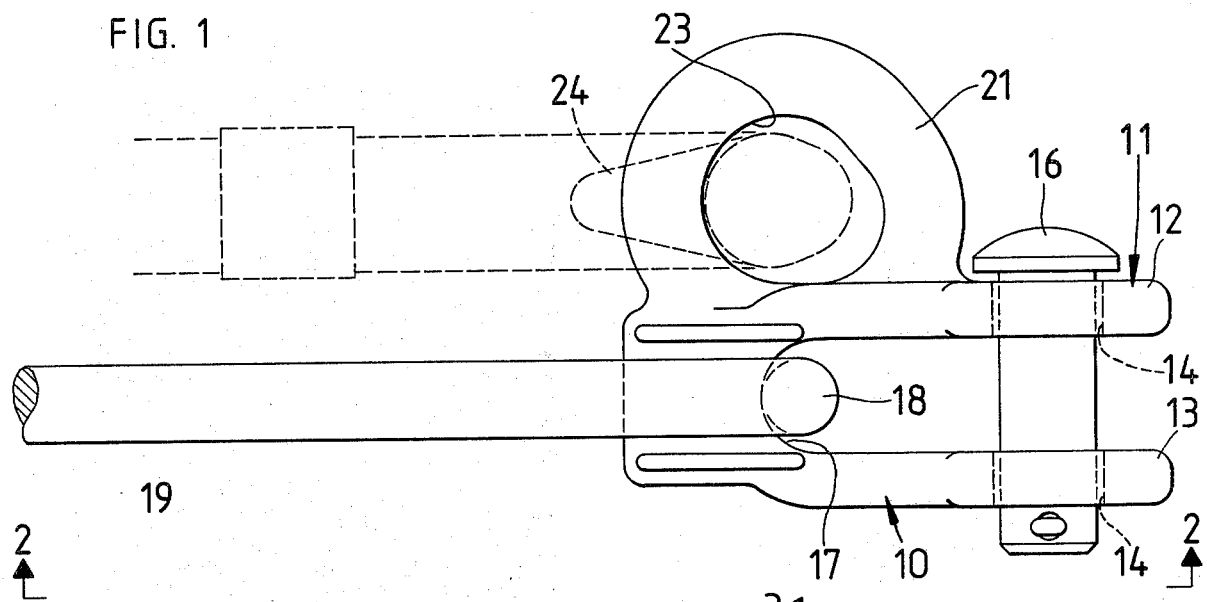
FIG. 1 is an elevational view of my clevis thimble assembly showing the hook-like member of a tensioning device connected to an eye provided in the member which projects laterally from the body of the connector.
Figure 2:
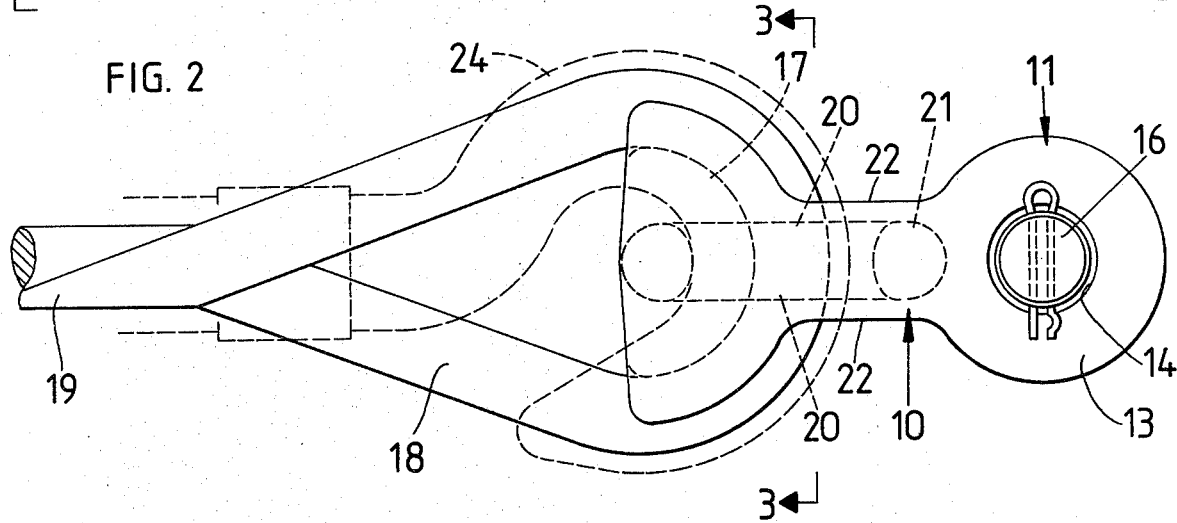
FIG. 2 is an elevational view taken generally along the line 2—2 of FIG. 1.
Figure 3:
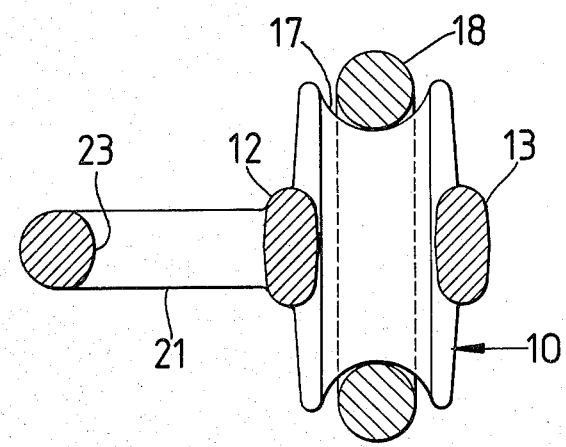
FIG. 3 is a sectional view taken generally along the line 3—3 of FIG. 2.

Referring now to the drawings for a better understanding of my invention, I show in FIGS. 1-3 an elongated body member generally at 10 having a clevis 11 at one end thereof adapted for connection to a suitable supporting structure. The clevis 11 comprises two spaced apart legs 12 and 13, with each leg having an opening 14 therein in position to receive a pin-like member 16.

A thimble having a convexly curved retainer groove 17 is carried by the other end of the elongated body member 10 as shown. The retainer groove 17 serves as a bearing surface adapted to receive a loop end 18 of a conductor 19. The loop 18 may be in the form of a conventional preformed deadend connection.

A laterally projecting member 21 is carried by the elongated body member 10 and is shown as extending in a vertical plane perpendicular to the retainer groove 17. The vertical sides 22 of the leg 12 extend parallel to the vertical sides 20 of the laterally projecting member 21, as shown in FIG. 2. An opening 23 is provided in the laterally projecting member 21 in position to receive the hook-like member 24 of a conventional tensioning device, such as a comealong or coffin hoist. While I have shown but one laterally extending member 21, it will be apparent that more than one laterally projecting member 21 may be provided.

From the foregoing description, the operation of my improved assembly will be readily understood. The dead end loop 18 of a conductor 19 is positioned within the retainer groove 17 and secured in place by conventional means. The clevis 11 is secured to a supporting structure in the usual manner.

The hook-like member 24 of a conventional tensioning device, such as a comealong, is then attached to the eye opening 23 of the laterally projecting member 21 whereby tension is applied to the conductor 19 to position and retain it in a desired location.

From the foregoing, it will be seen that I have devised an improved assembly which is simple and sturdy of construction. By providing an improved laterally projecting member having an eye for attaching a tensioning device, my connector is adapted for quick and easy attachment due to the fact that the hook-like member of the tensioning device is in spaced relation to the thimble and the loop of the conductor connected thereto. My clevis thimble connector may be adapted for a variety of uses, such as connecting and applying tension to guy wires, for use with high strength towers, attaching conductors to power line poles and the like. Also, by forming the entire body of my connector from a green sand core with the exception of the clevis pin, my improved connector is extremely economical in its manufacture since the molding, labor and material costs are reduced. Furthermore, my connector may be assembled in a safer manner at high elevations than conventional connectors due to the fact that attaching conductors do not have to be moved to one side for attaching the hook-like end of a conventional comealong.

While I have shown my invention in but one form, it will be obvious to those skilled in the art that it is not so limited, but is susceptible of various changes and modifications without departing from the spirit thereof.

What I claim is:

1. A clevis thimble assembly for connecting a tensioning device and a conductor to a supporting structure for sagging in a conductor on a power transmission line which comprises:
   (a) an elongated body member having a clevis at one end thereof for pivotally connecting said body member to a supporting structure,
   (b) a thimble carried by the other end of said body member and having a convexly curved retainer groove facing said clevis with said retainer groove defining a bearing surface,
   (c) a cable-like conductor member passing around said retainer groove and secured in its position in said retainer groove,
   (d) at least one laterally projecting member carried by said other end of said elongated body member at a distal point from said clevis and extending perpendicular to said retainer groove with there being an opening in said laterally projecting member in laterally spaced relation to said retainer groove and said cable-like conductor member passing around said retainer groove, and
   (e) a hook-like connector element carried by said tensioning device and extending through said opening in said laterally projecting member with said hook-like connector element extending in the same direction as said cable-like conductor for tensioning said cable-like conductor to permit sagging in of a conductor on a power transmission line.

* * * * *